United States Patent
Yoshino et al.

(10) Patent No.: US 10,909,361 B2
(45) Date of Patent: Feb. 2, 2021

(54) RECEIPT PROCESSING APPARATUS, PROGRAM, AND REPORT PRODUCTION METHOD

(71) Applicant: SEIKO EPSON CORPORATION, Tokyo (JP)

(72) Inventors: Masumi Yoshino, Nagano (JP); Yosuke Orisaka, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 16/268,542

(22) Filed: Feb. 6, 2019

(65) Prior Publication Data

US 2019/0244020 A1 Aug. 8, 2019

(30) Foreign Application Priority Data

Feb. 8, 2018 (JP) ................................ 2018-021225
Sep. 28, 2018 (JP) ................................ 2018-184309

(51) Int. Cl.
| | |
|---|---|
| G06K 9/00 | (2006.01) |
| G06K 9/20 | (2006.01) |
| G06K 9/46 | (2006.01) |
| H04N 1/32 | (2006.01) |
| G06K 9/32 | (2006.01) |
| H04N 1/00 | (2006.01) |
| H04N 1/21 | (2006.01) |
| H04N 1/40 | (2006.01) |
| G06Q 40/00 | (2012.01) |

(52) U.S. Cl.
CPC ..... *G06K 9/00469* (2013.01); *G06K 9/00442* (2013.01); *G06K 9/2054* (2013.01); *G06K 9/325* (2013.01); *G06K 9/4652* (2013.01); *H04N 1/00331* (2013.01); *H04N 1/00803* (2013.01); *H04N 1/2104* (2013.01); *H04N 1/32112* (2013.01); *H04N 1/40062* (2013.01); *G06K 2209/01* (2013.01); *G06Q 40/123* (2013.12); *H04N 1/00442* (2013.01); *H04N 2201/0081* (2013.01); *H04N 2201/3225* (2013.01)

(58) Field of Classification Search
None
See application file for complete search history.

(56) References Cited

U.S. PATENT DOCUMENTS

| | | | |
|---|---|---|---|
| 7,792,709 B1 * | 9/2010 | Trandal | G06Q 20/201 705/26.1 |
| 10,453,151 B2 * | 10/2019 | Pandipati | G06Q 40/02 |
| 2008/0298686 A1 | 12/2008 | Okochi | |

(Continued)

FOREIGN PATENT DOCUMENTS

JP 11-219408 A 8/1999

OTHER PUBLICATIONS

The Extended European Search Report for the corresponding European Patent Application No. 19156228.9 dated Jun. 11, 2019.

*Primary Examiner* — Samah A Beg
(74) *Attorney, Agent, or Firm* — Global IP Counselors, LLP

(57) ABSTRACT

An analysis section for performing a predetermined image analysis processing for each of a first image and a second image generated by a performance of duplex scan by a scanner section and a receipt processing apparatus for determining an image of a front of a receipt on the basis of an analysis result of the analysis section.

13 Claims, 10 Drawing Sheets

(56) References Cited

U.S. PATENT DOCUMENTS

| | | | |
|---|---|---|---|
| 2012/0127501 A1* | 5/2012 | Kobayashi | G06K 15/1868 |
| | | | 358/1.13 |
| 2015/0077817 A1 | 3/2015 | Shimazaki et al. | |
| 2016/0110658 A1* | 4/2016 | Sanou | G06F 3/1242 |
| | | | 705/5 |
| 2017/0221038 A1* | 8/2017 | Yasui | B41J 11/0075 |
| 2019/0384970 A1* | 12/2019 | Johnson | G06K 9/62 |
| 2020/0142862 A1* | 5/2020 | Lopez Ruiz | G06Q 40/12 |
| 2020/0193525 A1* | 6/2020 | Vermer | G06K 9/00469 |
| 2020/0242347 A1* | 7/2020 | Harada | G06K 9/00456 |
| 2020/0250417 A1* | 8/2020 | Torres | G06F 40/295 |

\* cited by examiner

FRONT

REAR

XXXX SHOP

| | |
|---|---|
| Bakery Roll | 5.19 |
| Tomato | 2.56 |
| Natural Cheddar | 7.40 |
| | |
| Total | 15.15 |
| Cash | 15.15 |
| Change | 0.00 |

FRONT

FIG. 3

KEEP THIS
RECEIPT
Original Receipt
Required for an
Exchange or
Refund

KEEP THIS
RECEIPT
Original Receipt
Required for an
Exchange or
Refund — P5

KEEP TH
RECEIPT
Original Re
Required fo
Exchange
Refund

REAR

FIG. 4

FRONT

REAR

| FRONT/REAR IDENTIFICATION DATA | | | |
|---|---|---|---|
| READING NUMBER | FIRST IMAGE | FIRST IMAGE | |
| ⋮ | ⋮ | ⋮ | |
| No.501 | FRONT | REAR | |
| No.502 | REAR | FRONT | |
| No.503 | — | — | R3 |
| No.504 | REAR | FRONT | |
| ⋮ | ⋮ | ⋮ | |

FRONT

REAR

RECEIPT PROCESSING APPARATUS, PROGRAM, AND REPORT PRODUCTION METHOD

BACKGROUND

The entire disclosure of Japanese Patent Application No. 2018-021225, filed Feb. 8, 2018 is incorporated by reference herein.

The entire disclosure of Japanese Patent Application No. 2018-184309, filed Sep. 28, 2018 is incorporated by reference herein.

1. Technical Field

The present invention relates to a receipt processing apparatus and the like for extracting expense information printed in a receipt.

2. Related Art

In the related art, a technique for optically reading and recognizing expense information printed in a receipt and managing a purchase history is known, and is used for a tax return or a household bookkeeping, for example. In this case, a method of reading a receipt includes a method of scanning a front of the receipt by performing a single-side scanning and a method of performing a duplex scan and selectively using the image of the front. In the former reading method, it was necessary for a user to set the front/rear of the receipt in alignment in the scanner device so that the front can be read correctly.

On the other hand, in the latter reading method, there is an advantage that receipts can be collectively set in the scanner device without no conscious regard to the front/rear. However, it is necessary to select the image of the front from the two read images of the front and rear, so that leaving all the selections to the user costs the user time and effort. As a technique for solving this problem, a technique for determining the front and the rear of a blank paper sheet is available. For example, JP-A-11-219408 discloses a method of determining a side to be a rear when a character string is not extracted from the read image (for example, refer to JP-A-11-219408).

However, the rear of the receipt is not limited to a blank paper sheet. For example, there is also information on a store (name and address, telephone number, website address, and the like of the store. Hereinafter, referred to as store information), an advertisement and the like. Therefore, merely determining the rear by applying the technique in JP-A-11-219408 is insufficient for reducing the user's time and effort needed for deleting the rear.

SUMMARY

An advantage of some aspects of the invention is to provide a technique that can further reduce the user's time and effort in reading a receipt of which the rear is not a blank compared with the technique in the related art.

According to an aspect of the invention, there is provided a receipt processing apparatus including a scan control section that instructs a scanner section to perform a duplex scan of the receipt so as to generate a first image which is an image of a first side including a first pattern and a second image which is an image of a second side including a second pattern, a determination section that determines whether each of the first image and the second image is the front or the rear on the basis of each the first pattern and the second pattern, a discard section that discards the image of the rear, and an output section that extracts expense information printed in the receipt and outputs a report on the basis of the analysis result of the image of the front.

BRIEF DESCRIPTION OF THE DRAWINGS

The invention will be described with reference to the accompanying drawings, wherein like numbers reference like elements.

FIG. 3 is a schematic view showing another example of the front of the receipt.

FIG. 4 is a schematic view showing an example of the rear of the receipt shown in FIG. 3.

DESCRIPTION OF EXEMPLARY EMBODIMENTS

Figure 1:
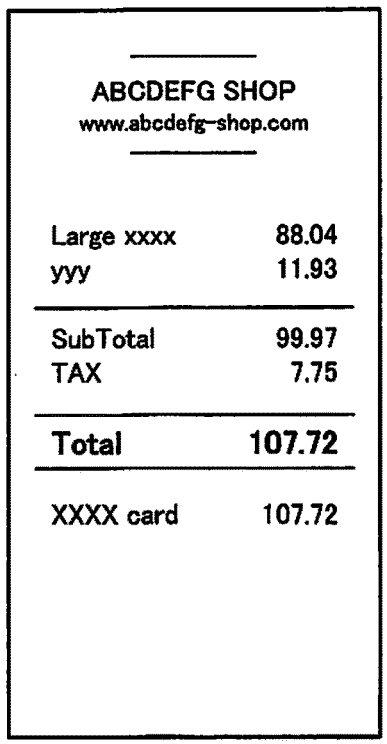
FIG. 1 is a schematic view showing an example of a front of a receipt.

Hereinafter, preferred embodiments of the invention will be described with reference to the drawings. The invention is not limited to the embodiments to be described below, and modes to which the invention is applicable are not limited to the following embodiments. In addition, in the description of the drawings, the same numerals reference the same portions.

Principle

The receipt processing apparatus in accordance with the present embodiment performs a report output processing for extracting expense information from a receipt and outputting a report. An overall flow is as follows. First, in the report output processing, the receipt is duplex scanned by scanner device which is a scanner section connected to the receipt processing apparatus, and the first image which is the image of the first side including the first pattern and a second image which is the image of the second side including the second pattern are acquired for each of the target receipt set in the scanner section. Here, the term "pattern" is used as a generic name of a character, a symbol, a figure or a combination thereof with a color. Therefore, the first pattern means the content included in the first image, and the second pattern means the content included in the second image. In order to avoid confusion in understanding, in the following description, the first pattern included in the first image may be simply referred to as the first image, and the second pattern included in the second image is simply referred to as the second image. After the first image and the second image are acquired, each of the first image and the second image is subjected to an optical character recognition/reader (OCR) processing, expense information extraction processing in which expense information printed in the receipt is extracted on the basis of the character recognition result, which is a result of an analysis by the OCR processing is performed, and then a report is output.

Here, the necessary expense information is printed on the front of the receipt, and the information read from the rear is unnecessary. On the other hand, since receipts are not necessarily set in the scanner section with the front/rear assorted, it is necessary to specify which of the first image and the second image is the image of the front prior to the expense information extraction processing. As a process for this purpose, in accordance with the embodiment, a determination on a predetermined determination item is used to perform a front/rear determination in which the front/rear of the acquired first image and second image is determined. Hereinafter, the six determination items in accordance with the embodiment will be listed, and the principle of front/rear determination will be described with reference to the receipts shown in FIGS. 1 to 6 as examples.

Blank Side Item

Among the receipts, store information such as a store name and address, a telephone number, a mail address, and a URL (uniform resource locator) of a home page, an advertisement, and a return policy is printed on the rear of some receipts, and for other receipts, the rear is blank. Since the expense information is always written on the front, if the read side is blank, that blank side is a rear. Therefore, in accordance with the embodiment, with a blank side item serving as the first determination item, whether or not one of the first image and the second image is a blank image is determined. Then, when one of the first image and the second image is a blank image, the blank image is determined to be the image of the rear. In this case, the other image is taken to be the front, and the expense information extraction processing of the subsequent stage is performed with the character recognition result.

In the case of a receipt of which the rear is not a blank side, neither the first image nor the second image is determined to be a blank image. Therefore, in this case, the determination result of the blank item does not determine the image of the rear.

Used Color Item

In general, the expense information on the front is printed in an achromatic or low saturation color such as black, gray and Oxford blue. On the other hand, an advertisement and the like on the rear is printed in a high chromatic color. Therefore, with the used color item serving as the second determination item, the color used in the first image and the second image is determined. When only one of the first image and the second image satisfies the predetermined low saturation condition, the one image is determined to be the image of the front. In this case, the expense information extraction processing of the subsequent stage is performed with the character recognition result of the image of the front. One or more achromatic or low saturation colors such as black or gray meet the low saturation condition. One or a plurality of colors that can be used in printing the expense information may be established or numerical condition of chroma may be established.

However, there may also be a receipt in which a part of the description on the front is printed in color. For example, some receipts have the store names printed in color on the front, and some receipts have advertisements printed in color on the front. In that case, neither the first image nor the second image is determined to be an image printed in a color only that satisfies the low saturation condition with respect to the used color item. Therefore, in this case, the front image is not determined by the determination result of the used color item.

Numerical Item

Since the expense information on the front includes amount information, it always includes a numeral. On the other hand, the description on the rear may not include numerals. Therefore, with the numerical item serving as the third determination item, whether or not each image includes a numeral is determined from the character recognition result of the first image and the second image. More precisely, whether or not a numeral is included in the first pattern included in the first image and the second pattern included in the second image is determined. When only one of the first image and the second image is an image not including a numeral, the one image is determined to be an image of the rear.

Figure 2:
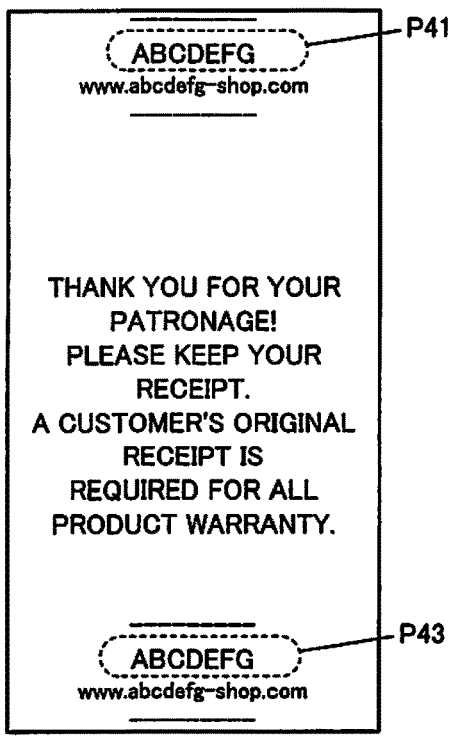
FIG. 2 is a schematic view showing an example of a rear of the receipt shown in FIG. 1.

For example, in the receipt of which the front is shown in FIG. 1 and the rear is shown in FIG. 2, the description content on the front in FIG. 1 includes numerals while the characters on the rear in FIG. 2 do not include numerals. In such a receipt, from the result of the determination in the numerical item, the image in FIG. 2 is determined to be the image on the rear of the receipt. In this case, the image of the front in FIG. 1, which is the other image, is taken to be the image of the front, and the expense information extraction processing of the subsequent stage is performed with the character recognition result of the image of the surface.

However, in the case of a receipt in which the description content on the rear includes numerals like the receipt in which the address, the telephone number and the like of the store are described on the rear, for example, both the first image and the second image are determined to be the images that include numerals. Therefore, in this case, the determination result of the numerical item does not determine the image of the rear.

Character String Direction Item

The expense information on the front is written in a horizontal writing in general with the lengthwise direction of the receipt being an up/down direction. In other words, the expense information is written in a crosswise direction of the paper sheet in a horizontal writing. In contrast, an advertisement or the like on the rear is in a horizontal writing with the crosswise direction of the receipt being an up/down direction. In other words, the advertisement can be written in a horizon writing in a lengthwise direction and can be written in a vertical direction in a crosswise direction. In addition, it is also conceivable that an advertisement or the like is written such that the characters are disposed diagonally with respect to the lengthwise direction and the crosswise direction of the receipt.

With the character string direction serving as the fourth determination item, the direction of characters included in each pattern of the respective image is determined from the character recognition result of the first image and the second image. More specifically, in accordance with the embodiment, with the direction of the characters of which the upper and lower sides are in the lengthwise direction of the receipt being set at 0°, and the direction of the characters of which the upper and lower sides are in the crosswise direction being set at 90°, the direction of each character is determined. Then, when the direction of all the characters satisfies the predetermined inappropriate direction condition in only one of the first image and the second image, the one image is determined to be the image on the rear. Here, the inappropriate direction condition is decided on the basis of the relative angle between the direction of the characters and the lengthwise direction of the receipt. For example, the condition can be established in advance like "the relative angle is 20° or more and 160° or less, or 200° or more and 340° or less".

For example, in the receipt of which the front is shown in FIG. 3 and the rear is shown in FIG. 4, the description content on the rear in FIG. 4 is written in a horizontal writing with the crosswise direction of the receipt being an up/down direction. In such a receipt, the determination result of the character string direction item is that the image on the side in FIG. 4 is determined to be the image of the rear. In this case, the image in FIG. 3, which is the image of the other side, is taken to be the image of the front, and the expense information extraction processing of the subsequent stage is performed with the character recognition result.

Repeat Item

In some description modes on the rear of a receipt, the store information, an advertisement or the like is printed repeatedly. More specifically, in some receipts, the store information printed repeatedly at predetermined intervals on the rear, and in other receipts, the merchandise advertisement, the return policy, or the like is printed repeatedly on the rear. There, with the repeat item serving as the fifth determination item, whether or not a repetitive printing body, which is the identical character string, is repeated in the first pattern included in the first image and the second pattern included in the second image is determined from the character recognition result of the first image and the second image. In accordance with the embodiment, a character string composed of ten or more characters in the first image or the second image is looked for, and in the case where N or more of the same character strings are included therein, the repetitive printing body, which is the character string in the image, is determined to be repeated. In accordance with the embodiment, N=2, but N may be three or more. When the repetitive printing body is repeated only in one of the first image or the second image, the one image is determined to be the image on the rear.

Figure 5:
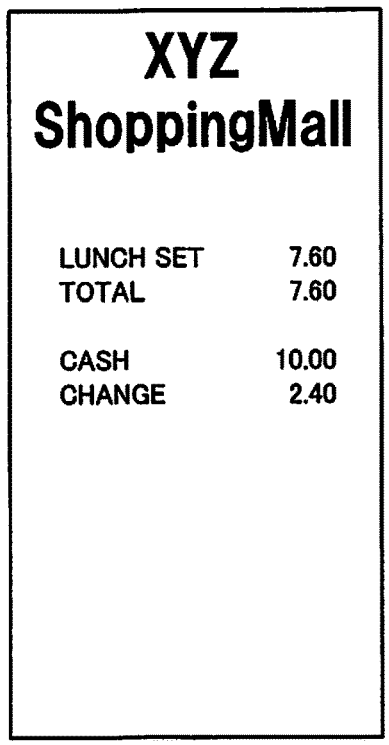
FIG. 5 is a schematic view showing another example of the front of a receipt.
Figure 6:
FIG. 6 is a schematic view showing an example of the rear of the receipt shown in FIG. 5.

For example, in the receipt of which the front is shown in FIG. 5 and the rear is shown in FIG. 6, the image of the rear in FIG. 6 includes a plurality of the identical character strings "XYZShoppingMall" shown to be encircled by dotted lines P11, P13, and P15 and composed of 15 letters. FIG. 6 includes the three. In such a receipt, the image of FIG. 6 is determined to be the image of the rear of the receipt from the determination result of the repeat item. In this case, the image of FIG. 5, which is the other image, is taken to be the front, and the expense information extraction processing of the subsequent stage is performed with the character recognition result of the image on the front.

However, there may be cases where the description content on the front of the receipt includes a plurality of identical character strings in the same way as the character string of the merchandise name is repeated when a plurality of the identical items are purchased. In that case, the repetitive printing body of both the first image and the second image is determined to be printed repeatedly. Therefore, in this case, the image on the front is not determined by the determination result of the repeat item.

Specific Character String Item

The expense information on the front includes specific character strings such as "Tax" and "Total", as shown in FIGS. 1, 3, and 5. Therefore, with the specific character string item serving as the sixth determination item, whether or not each image includes a specific character string is determined from the character recognition result of the first image and the second image. More precisely, whether a specific character string is included in the first pattern included of the first image and the second pattern included of the second image is determined. When only one of the first image and the second image is the image that includes a specific character string, the one image is determined to be the image of the front. In this case, the expense information extraction processing of the subsequent stage is performed with the character recognition result of the image on the front. As for the specific character string, in addition to the "Tax" and "Total" presented as examples, a character string which can be written on the front such as "Card", "Cash", "Change", or the like may preferably be set in advance.

Among the determination items listed above, the two items of the blank side item and the used color item can be determined from the pixel value of the first image and the second image. On the other hand, the four items of the numerical item, the character string direction item, the repeat item, and the specific character string item are determined from the character recognition result of the first image and the second image. Therefore, the former two items can be determined without OCR processing, and as a result, if the front and the rear are determined, the OCR processing of the image on the rear is unnecessary. On the other hand, in the determination of the latter four items, the OCR processing of both the first image and the second image is performed. Therefore, in accordance with the embodiment, the blank side item and the specific character string item are determined sequentially prior to OCR processing. Then, when the front and the rear are determined by none of the determination items, the first image and the second image are subjected to the OCR processing, and by sequential determination in the order of the numerical item, the character string direction item, the repeat item and the specific character string item, the processing load is reduced.

By the way, in the front/rear determination described above, there is a possibility that the front/rear is not determined by any of the six determination items. Even if the front/rear are determined, there may be a case of wrong determination. There, in accordance with the embodiment, for each of the target receipt, the first image and the second image are displayed with the image of the front and the image of the rear, so that the user is presented with the front/rear determination result of each of the receipt. When an identification change operation is received from the user so that the identification of the image of the front and the image of the rear is changed and the discard execution operation is input, the image determined to be rear is discarded.

Figure 7:
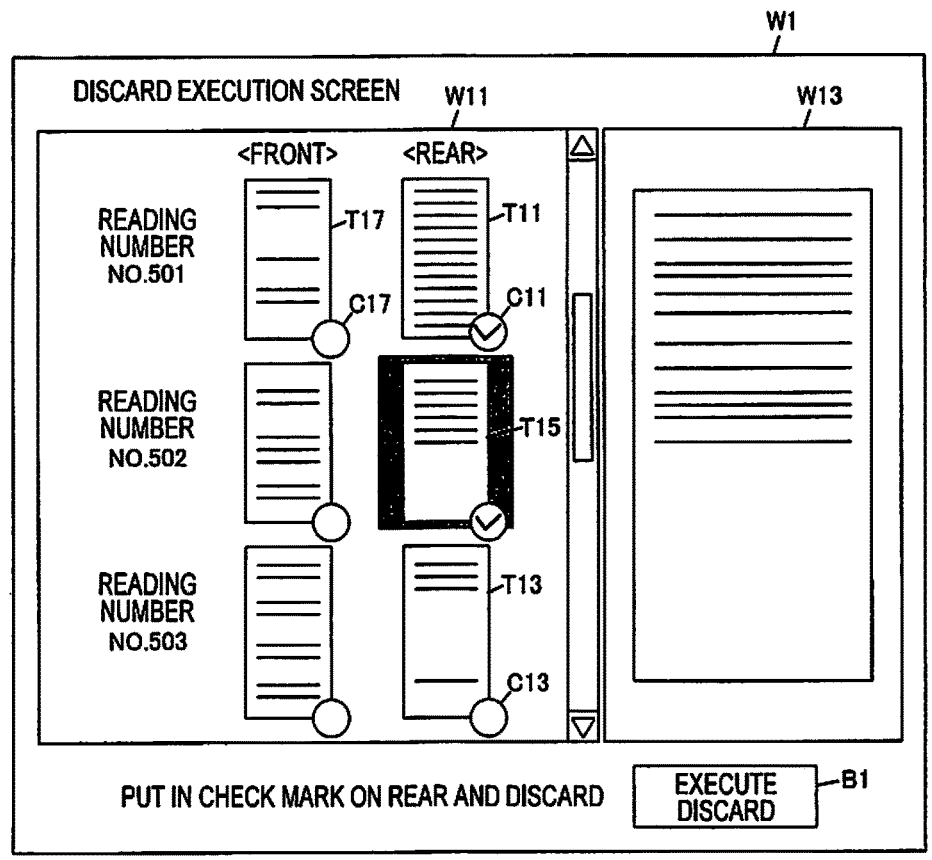
FIG. 7 is a schematic view schematically showing an example of a discard execution screen.

FIG. 7 is a schematic view schematically showing an example of the rear discard execution screen. As shown in FIG. 7, the rear discard execution screen W1 includes a front/rear determination result identification display section W11, a selected receipt side display section W13, and a discard execution button B1. The discard execution button B1 is to be used to input the discard execution operation and is disposed in the screen together with a message instructing the user to put a check mark on the rear to perform the discard execution operation, for example.

In the front/rear determination result identification display section W11, thumbnails of the first image and the second image are displayed side by side for each reading number unique to the receipt. Specifically, the thumbnail of the front is disposed on the left and the thumbnail of the rear is disposed on the right on the basis of the result of the front/rear determination, and like the thumbnail T11 shown in FIG. 7, for example, the receipt determined to be a rear or a front by the front/rear determination is displayed with the check C11, indicating a rear, attached to the thumbnail on the right from the beginning. On the other hand, as for the receipt that is not determined to be either the front or the rear as a result of front/rear determination, assuming that the first image is the front and the second image is the rear for example, the first image is displayed on the left and the second image is displayed on the right, and the check mark C13 is displayed unchecked like the thumbnail T13 in FIG. 7. The display of the check mark C11 being attached to the right thumbnail from the beginning means that a new receipt is read by the scanner and the check mark C11 is attached at the same time as the image of the newly read receipt is added to the display or outside the short period of time while the operation of the user is not received.

In the front/rear determination result identification display section W11, the user inputs the identification change operation by selecting or changing the check mark. That is, the user checks whether the rear is correctly checked in the front/rear determination result identification display section W11, and, if there is an error, puts in a check mark on the thumbnail of the right side. Also, as for the receipt with no check mark, the user selects the rear of the receipt and puts in a check mark. At that time, by the appropriate selection of the thumbnail, the image of the receipt side can be displayed large on the selected receipt side display section W13 so that the contents can be confirmed. In the example of FIG. 7, the thumbnail T15 is selected and displayed on the selected receipt side display section W13 enlarged.

For example, if the thumbnail T13 is an image of the rear, the user puts in a check mark C13 in the thumbnail T13. Also, if the thumbnail T11 is an image of the front, not the rear, the user removes the check mark C11 from the thumbnail T11 and puts in the check mark C17 to the thumbnail T17.

Then, when the user confirms the check mark of the rear and finishes the selection/change, the user clicks the discard execution button B1. Then, all the images of the rear are discarded. According to this, prior to the expense information extraction processing, the front/rear determination result is presented to the user so that the image of the rear can be discarded after the front/rear determination result is modified in accordance with the operation input from the user. Therefore, the user only needs to select the rear of the receipts of which the front/rear is not determined automatically by the result of the front/rear determination and to perform the operation to select the correct rear if there is a wrong determination. Therefore, the user's time and effort in discarding the image of the rear of the receipt read by the duplex scan can be reduced substantially. Although the check mark is put on the rear in the description, the embodiment certainly may be configured such that the check mark is put on the front and that image of the side without a check mark is discarded.

Further, as described above, after the discard execution operation is received from the user and the discard of the rear is executed, the expense information extraction processing is performed with the character recognition result of the image of the front, and the report is output. In accordance with the embodiment, when the report output instruction operation is input from the user, a report is output by displaying the extracted expense information for each receipt.

Figure 8:
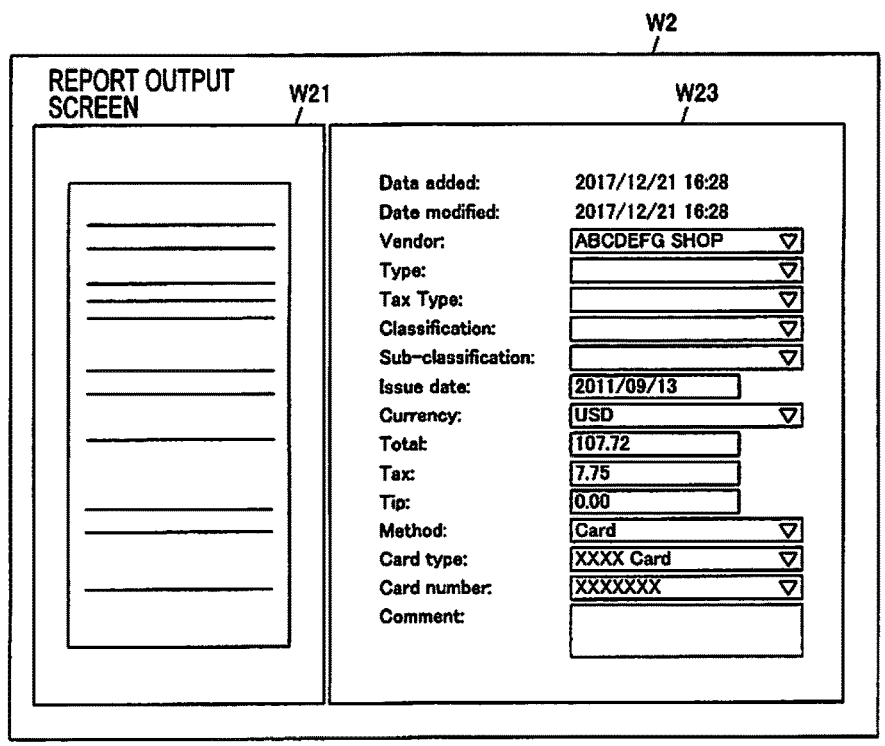
FIG. 8 is a schematic view schematically showing an example of a report output screen.

FIG. 8 is a schematic view schematically showing an example of the report output screen. As shown in FIG. 8, the report output screen W2 includes a selected receipt front image display section W21 and an expense information display section W23. In the selected receipt front image display section W21, the image of the front of the receipt which is a report output target is displayed, and, in the expense information display section W23, the expense information extracted from the receipt is displayed. Specifically, as shown in FIG. 8, the expense information includes the information of expense items such as, for example, "Vendor" representing the payee, "Tax" representing the tax amount, "Total" representing the total amount, "Method" representing payment methods such as cash, credit card, or the like. In the expense information display section W23, the expense information can be edited by selection of items, entry of numerical values, and the like.

Functional Configuration

Figures 9, 10:
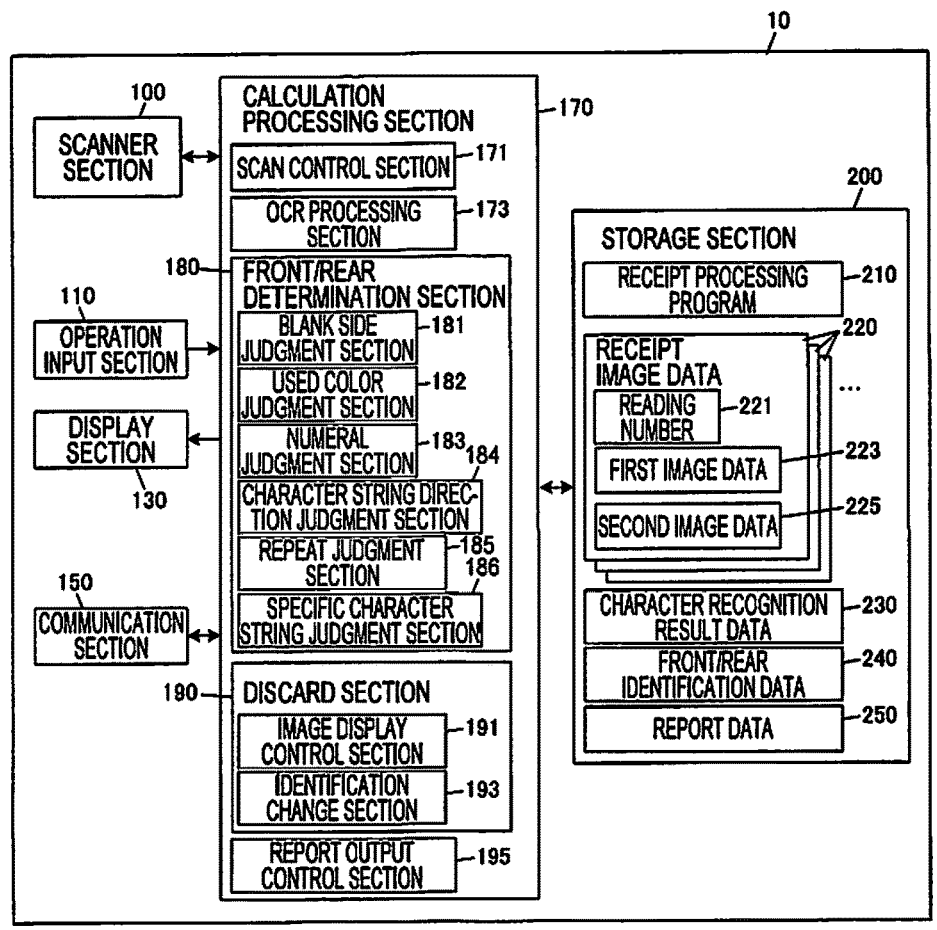
FIG. 9 is a block diagram showing an example of a functional configuration of a receipt processing apparatus.
FIG. 10 is a view showing an example of a data configuration of front/rear identification data.

FIG. 9 is a block diagram showing a functional configuration example of the receipt processing apparatus 10. The receipt processing apparatus 10 is, for example, a computer such as a personal computer used by a user, and is configured to be connected to a scanner section 100 for performing a duplex scan of a receipt and acquiring a first image and a second image. As shown in FIG. 9, the receipt processing apparatus 10 includes an operation input section 110, a display section 130 as an output section, a communication section 150, a calculation processing section 170, and a storage section 200. Although the receipt processing apparatus 10 includes the scanner section 100 in the description, the scanner section 100 may certainly be considered as a separate device, and the receipt processing apparatus 10 may be configured without the scanner section 100.

The operation input section 110 receives various operation inputs by the user and outputs an operation input signal corresponding to the operation input to the calculation processing section 170, which can be realized by a button switch, a lever switch, a dial switch, a trackpad, a mouse, or the like.

The display section 130 is realized by a display device such an LCD (Liquid Crystal Display) and performs various display on the basis of the display signals from the calculation processing section 170.

The communication section 150 is a communication device for transmitting and receiving data to and from the outside under the control of the calculation processing section 170. As for the communication method of the communication section 150, various methods can be applied, including a wired connection by a cable conforming to a predetermined communication standard, a connection by an intermediate device which is called a cradle or the like and serves as a charger, a wireless connection by a wireless communication, and the like.

The calculation processing section 170 is realized by the electronics components such as, for example, a CPU (Central Processing Unit), GPU (Graphics Processing Unit), ASIC (Application Specific Integrated Circuit), FPGA (Field Programmable Gate Array), processors in cooperation therewith, and IC memory. Then, the calculation processing section 170 performs input/output control of data among functioning sections and executes various calculation processing on the basis of a predetermined program, the operation input signal from the operation input section 110, image data input from the scanner section 100 and the like. Each section constituting the calculation processing section 170 may be composed of hardware such as a dedicated module circuit or the like.

The calculation processing section 170 includes a scan control section 171, an OCR processing section 173 as an analysis section, a front/rear determination section 180, a discard section 190, and a report output control section 195.

The scan control section 171 instructs the scanner section 100 to perform the duplex scan of the receipt so as to generate a first image of the first side and a second image of the second side and acquire the first image and the second image for each receipt to be read.

The OCR processing section 173 performs OCR processing as an image analysis processing on each image of the first image and the second image or the image of the front thereof, recognizes the characters in the image, more specifically, recognizes the characters in the pattern included in the image, and generates the text data.

The front/rear determination section 180 subsequently determines the six items in the order of the blank side item, the used color item, the numerical item, the character string direction item, the repeat item, and the specific character string item as described above, and performs the front/rear determination as to which one is a rear or which one is the front out of the first image and the second image. More specifically, the front/rear determination relating to the two items of the blank side item and the used color item is performed sequentially prior to the OCR processing. On the other hand, when the front/rear determination is not made by the previous two items, the front/rear determination relating to the four items in the order of the numerical item, the character string direction item, the repeat item, and the specific characteristic writing item is performed after OCR processing. The front/rear determination section 180 includes a blank side determination section 181 as a third determination section for determining the blank side item, a used color determination section 182 as a fourth determination section for determining the used color item, a numeral determination section 183 for determining the numerical item, a character string direction determination section 184 as a second determination section for determining the character string direction item, the repeat determination section 185 as a first determination section for determining the repeat item, and a specific character string determination section 186 for determining the specific character string item.

The discard section 190 discards the image of the rear out of the first image and the second image. The discard section 190 includes an image display control section 191 and an identification change section 193.

The image display control section 191 performs control for displaying the first image and the second image respectively with the image of the front and the image of the rear on the basis of the front/rear determination result by the front/rear determination section 180.

The identification change section 193 receives the identification change operation of the user and changes the identification whether the first image and the second image by the image display control section 191 are the images of the front or the images of the rear.

The report output control section 195 performs the expense information extraction processing for extracting expense information printed in the receipt on the basis of the character recognition result of the image on the front and performs the control for outputting a report. In accordance with the embodiment, the control for displaying the report describing the expense information on the display section 130 is performed.

The storage section 200 functions by a storage medium such as an IC memory, a hard disk, an optical disk, or the like. In the storage section 200, a program for operating the receipt processing apparatus 10 and executing various functions provided in the receipt processing apparatus 10 and the data to be used during the execution of the program are stored in advance or stored temporarily every time a processing is performed. The connection between the calculation processing section 170 and the storage section 200 is not limited to the connection by the internal bus circuit in the apparatus, but may be realized by a communication line such as LAN (Local Area Network) or the internet. In this case, the storage section 200 may function by an external storage device outside the receipt processing apparatus 10.

Further, the storage section 200 stores a receipt processing program 210, the receipt image data 220, the character recognition result data 230, the front/rear identification data 240, and the report data 250.

The calculation processing section 170 realizes the functions of the scan control section 171, the OCR processing section 173, the discard section 190, the report output control section 195, and the like by reading and executing the receipt processing program 210. When these functioning sections are realized by a hardware such as an electronic circuit, a part of the program for realizing the function can be skipped.

The receipt image data 220 includes the image data of the first image and the second image for each target receipt set in the scanner section 100. For example, one piece of receipt image data 220 includes a reading number 221, first image data 223, and second image data 225. The reading number 221 is assigned to the receipt as an identification number at the time the receipt is read.

The character recognition result data 230 includes the respective images of the first image and the second image or the text data relating to the image of the front, which are obtained as a result of the OCR processing for the corresponding receipt in association with the reading number.

In the front/rear identification data 240, as shown in FIG. 10, an identification flag is set to match the reading number to determine whether the first image and the second images are the images of the front or the images of the rear, for example. The front/rear identification data 240 is created by the image display control section 191 and rewritten by the identification change section 193 as deemed appropriate. That is, in the front/rear identification data 240 at the creation stage by the image display control section 191, the identification flag of the receipt, of which the front/rear is not determined by the front/rear determination section 180, is made blank by the record R3, for example. The identification flag made blank and the identification flag based on the wrong front/rear determination result by the front/rear determination section 180 are changed in accordance with the user's identification change operation.

The report data 250 includes the expense information extracted as a result of the expense information extraction processing for each target receipt. For example, one piece of report data 250 includes information on a reading number and various expense items such as "Tax", "Total", and "Method" extracted as expense information.

Processing Flow

Figure 11:
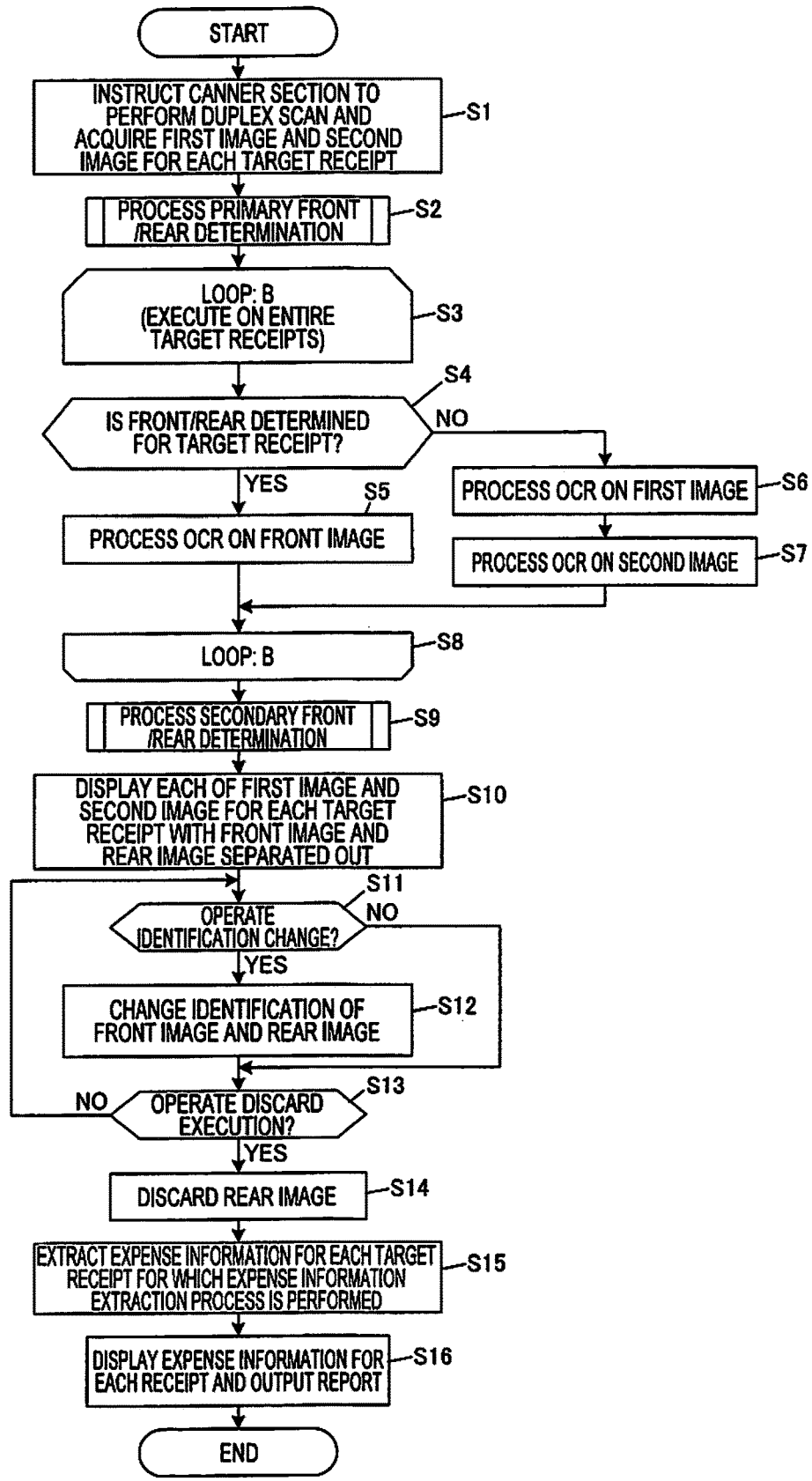
FIG. 11 is a flowchart showing a flow of a report output processing.

FIG. 11 is a flowchart showing the flow of the report output processing performed by the receipt processing apparatus 10 in accordance with the embodiment. The processing described here starts, for example, when the target receipt is set in the scanner section 100 by the user and a predetermined reading start operation is initiated. This processing can be realized by the calculation processing section 170 reading and executing the receipt processing program 210 from the storage section 200 and operating the respective sections of the receipt processing apparatus 10.

As shown in FIG. 11, in the report output processing, first, the scan control section 171 instructs the scanner section 100 to perform the duplex scan of the receipt and acquires the first image and the second image of each target receipt (step S1). At the time, the scan control section 171 assigns a reading number to the read receipt. Then, the assigned reading number is matched to the image data of the first image and the second image acquired for the receipt and is stored in the storage section 200 as the receipt image data 220.

Figure 12:
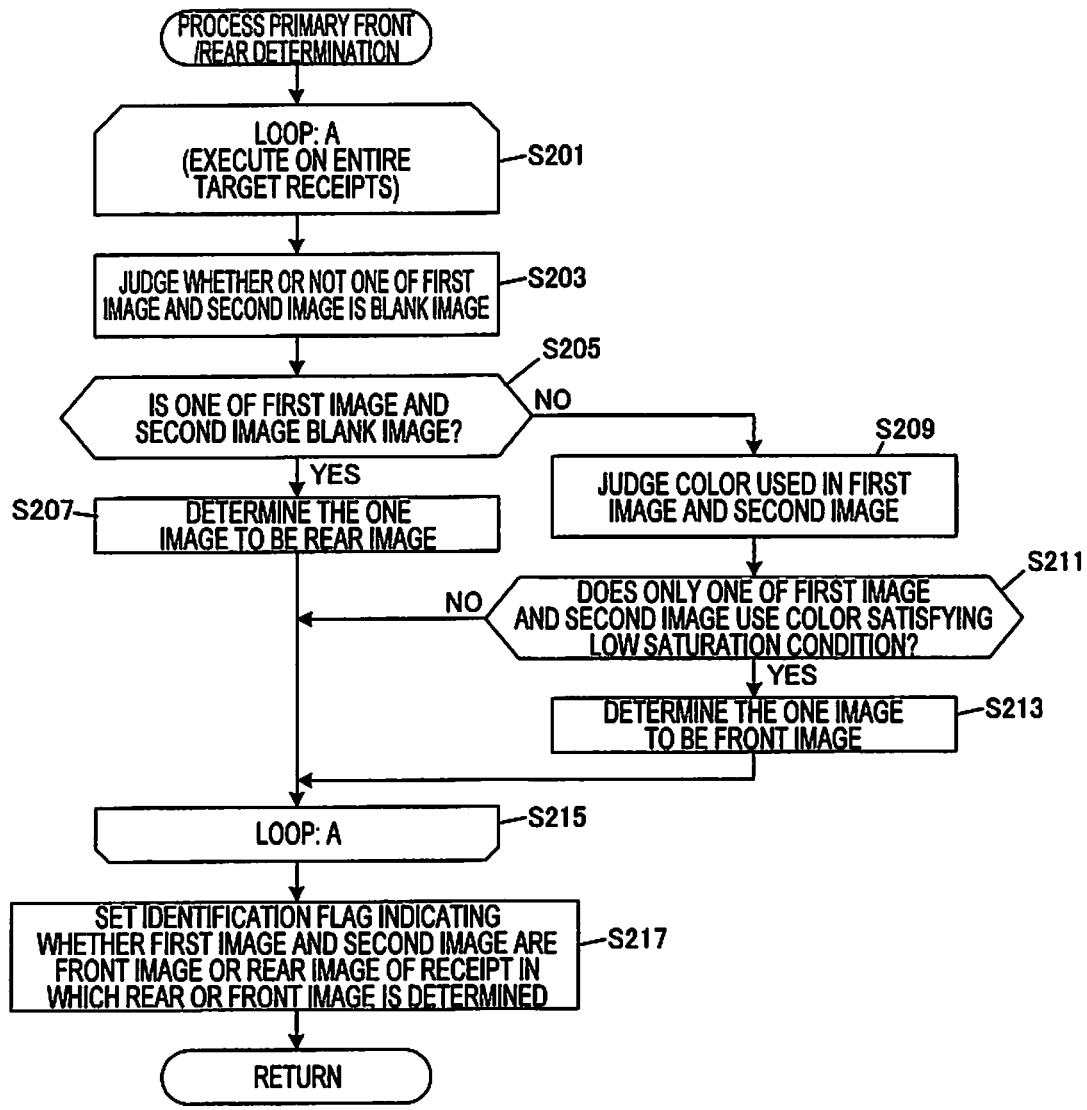
FIG. 12 is a flowchart showing the flow of primary front/rear determination processing.

If the first image and the second image for all the target receipts are acquired, the primary front/rear determination processing is performed (step S2). FIG. 12 is a flowchart showing the flow of the primary front/rear determination processing. As shown in FIG. 12, in the primary front/rear determination processing, first, the processing of the loop A is executed (steps S201 to S215) with the receipts to be read as target receipts one by one.

In the loop A, the front/rear determination section 180 first performs the front/rear determination about the blank side item. Specifically, the blank side determination section 181 determines whether or not one of the first image and the second image is a blank image (step S203). If one of the first image and the second image is a blank image (step S205: YES), the one image is determined to be an image of the rear (step S207).

On the other hand, if the determination in the step S205 is negative, the front/rear determination section 180 performs the front/rear determination on the used color item. Specifically, the used color determination section 182 determines the color used in the first image and the second image (step S209). If only one of the first image and the second image satisfies the predetermined low saturation condition (step S211: YES), it is determined that the one page is an image of the front (step S213).

Upon completion of the processing of the loop A, the image display control section 191 determines the image of the rear in the step S207, or sets the identification flag indicating whether the first image and the second image are the image of the front or the image of the rear of the receipt in which the image of the front is determined in the step S213, and stores the identification flag in the front/rear identification data 240 (step S217).

Return to FIG. 11. After the primary front/rear determination processing is performed, with the entire receipts to be read as sequential target receipts, processing of the loop B is performed (steps S3 to S8). In loop B, firstly, it is decided whether or not the front and rear of the target receipt were determined in the primary front/rear determination processing of the preceding stage. If the front/rear was determined (step S4: YES), OCR processing section 173 performs OCR processing on the image of the front (step S5), generates the text data relating to the image of the front, sets the data as the character recognition result data 230 of the target receipt, and stores the data in the storage section 200. On the other hand, if the front/rear of the target receipt is not determined (step S4: NO), the OCR processing section 173 performs the OCR processing of the first image (step S6) and the OCR processing of the second image (step S7), generates text data relating to the first image and the second images, sets the data as the character recognition result data 230 of the target receipt, and stores the data in the storage section 200.

Figure 13:
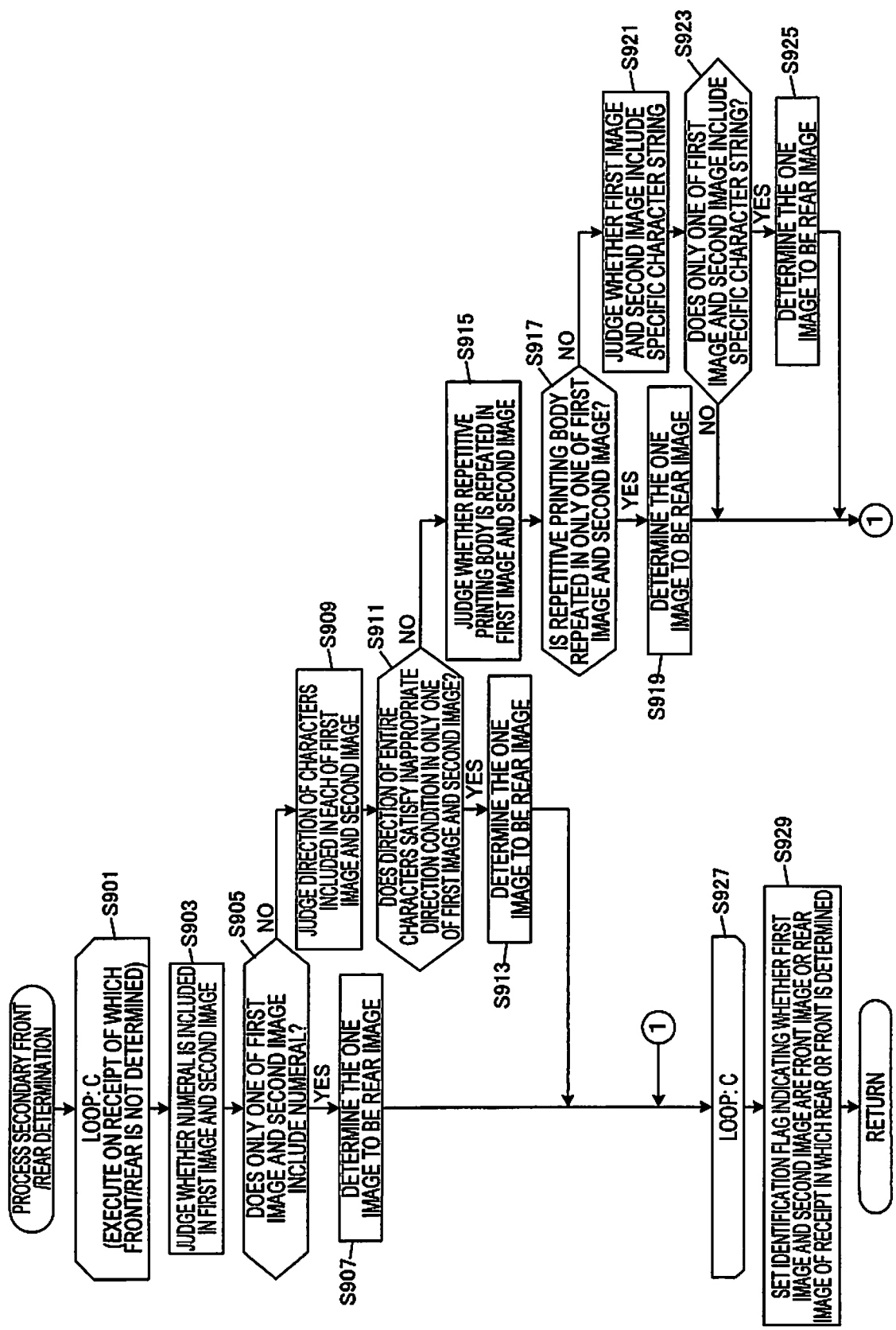
FIG. 13 is a flowchart showing the flow of secondary front/rear determination processing.

Upon completion of the processing of the loop B, a secondary front/rear determination processing is performed (step S9). FIG. 13 is a flowchart showing the flow of the secondary front/rear determination processing. As shown in FIG. 13, in the secondary front/rear determination processing, first of all, among the receipts to be read, the receipts of which the front and the rear are not determined in the primary front/rear determination processing are taken to be the sequential target receipts, and the processing of the loop C is executed (steps S901 to S927).

In the loop C, the front/rear determination section 180 firstly performs the front/rear determination of the numerical item. Specifically, the numeral determination section 183 determines whether or not each image includes a numeral from the character recognition result of the first image and the second image (step S903). If only one of the first image and the second image does not contain a number (step S905: YES), the one image is determined to be an image of the rear (step S907).

On the other hand, if the result in the step S905 is negative, the front/rear determination section 180 performs the front/rear determination on the character string direction item. Specifically, the character string direction determination section 184 determines the direction of the characters included in each of the respective images from the character recognition result of the first image and the second image (step S909). If the direction of the entire characters satisfies the predetermined inappropriate direction condition in only one of the first image and the second image (step S911: YES), the one image is determined to be the image of the rear (step S913).

On the other hand, if the result in step S911 is negative, the front/rear determination section 180 performs the front/rear determination on the repeat item.

Specifically, repeat determination section 185 determines from the character recognition result of the first image and the second image, whether or not a repetitive printing body which is a character string of 10 or more characters in each image is repeated (step S915). If the repetitive printing body is repeated only in one of the first image and the second image (step S917: YES), the one image is determined to be the image of the rear (step S919).

On the other hand, if the result in step S917 is negative, the front/rear determination section 180 performs front/rear determines the front/rear determination on the specific character string item. Specifically, the specific character string determination section 186 determines whether or not each image includes a specific character string from the character recognition results of the first image and the second image (step S921). If only one of the first image and the second image is an image including a specific character string (step S923: YES), the one image is determined to be the image of the front image (step S925).

Upon completion of the processing of the loop C, the image display control section 191 sets an identification flag indicating whether the first image and the second image are the image of the front or the image of the rear of the receipt in which the image of the rear is determined in the step S907, the step S913, or the step S919, or the image of the front is determined in the step S925 and stores in the front/rear identification data 240 (step S929).

Return to FIG. 11. If the secondary front/rear determination processing is performed, the identification image display control section 191 subsequently performs control for displaying the rear discard execution screen W1 presented as an example in FIG. 7 on the display section 130 by using the front/rear identification data 240, identifies the first image and the second image as the image of the front or the image of the rear for each target receipt respectively and displays the images (step S10). When the identification change operation of the user is input on the rear discard execution screen W1 (step S11: YES), the identification change section 193 changes the identification of the image of the front and the image of the rear so as to update the front/rear identification data 240 (step S12). When the discard execution operation of the user is input on the rear discard execution screen W1 (step S13: YES), the discard section 190 discards the image of the rear in accordance with the front/rear identification data 240 (step S14).

Thereafter, the report output control section 195 performs expense information extraction processing, and extracts expense information from the character recognition result of the image of the front for each target receipt (step S15). In accordance with the embodiment, regarding the receipt for which the determination relating to the blank side item and the used color item is performed prior to the OCR processing, and the front and the rear are determined by the two items, the OCR processing is performed only on the image of the front in the step S5. Therefore, when the identification is changed in step S12 for the receipt prior to the processing of the step S15, the OCR processing of the image of the front is required. On the other hand, if the front/rear is not determined by determination relating to the blank side item and the used color item, and the OCR processing is performed for the front/rear determination, and the expense information is extracted from the character recognition result of the side finally so determined to be the front by the character recognition results obtained there. However, even in this case, the OCR processing may be executed again.

Then, the report output control section 195 performs, for example, the control of displaying the report output screen W2 presented as an example in FIG. 8 on the display section 130 in response to the user's report output instruction operation and performs output of reports showing the expense information for each receipt (step S16).

As described above, in accordance with the embodiment, by the sequential determination of the six determination items, the rear of the receipt can be determined automatically and the time and effort of the user in discarding the image of the rear of the receipt read by the duplex scan can be substantially reduced. At the time of the front/rear determination, the two items of the blank side item and the used color item can be determined prior to the OCR processing. As a result, when the front/rear is determined, OCR processing can be performed only on the image of the front, and the reduction of processing load is reduced.

Examples of Modification

The embodiments to which the invention is applicable are not limited to the embodiments described above, and an addition, a deletion, a change, an integration, and a separation of the constituent elements can be performed as deemed appropriate. For example, among the receipt processing apparatuses described above, the scanner section and the display section may be separate apparatuses.

For example, the embodiment described above presents an example in which when, as a result of the determination of the direction of the character in the image in the character string direction item, the direction of the entire characters satisfies the predetermined inappropriate direction condition in only one of the first image and the second image, the one image is determined to be the image of the rear. On the other hand, when the direction of a part of the characters satisfies the inappropriate direction condition in only one of the first image and the second image, the one image is determined to be the image of the rear.

Further, for each image of the first image and the second image, the proportion of characters of which the direction satisfies the inappropriate direction condition is calculated, and only one of the portions relating to the first image and the second image satisfies the predetermined high proportion condition, the one image is determined to be the image of the rear.

Figure 14:
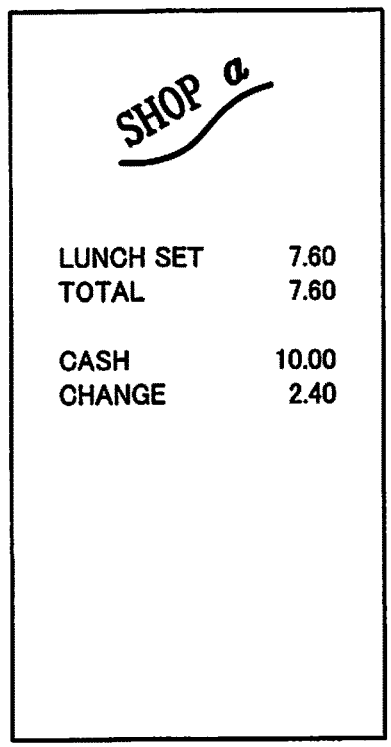
FIG. 14 is a schematic view showing another example of the front of a receipt.
Figure 15:
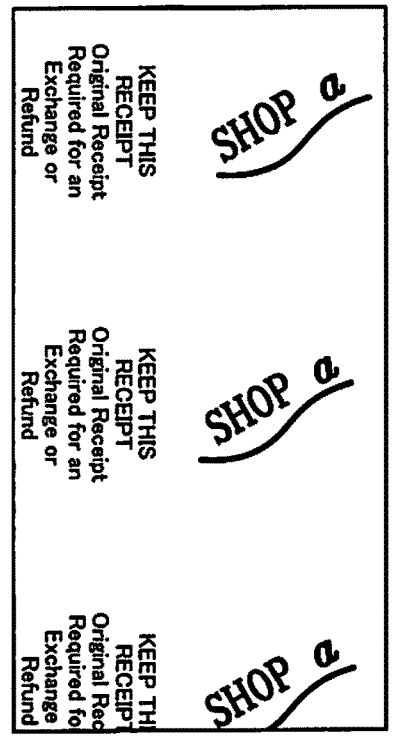
FIG. 15 is a schematic view showing another example of the rear of the receipt.

For example, among the receipts, in addition to the receipt with the design in which the store name of the selling store or the like is printed obliquely with respect to the crosswise direction of the receipt as in the receipt of which the front is shown in FIG. 14, there may be receipts in which a part of the characters on the front satisfies the inappropriate direction condition as in the receipt in which the store name of the selling store or the like is written vertically in the lengthwise direction, the receipt containing advertisements including characters written vertically on the front, or the like. Further, for example, as in the receipt of which the rear is shown in FIG. 15, there can be a receipt in which a part of the characters on the rear does not satisfy the inappropriate direction condition, like a receipt in which characters written horizontally with the lengthwise direction of the receipt as an up/down direction and not satisfying the inappropriate direction condition and characters written horizontally with the crosswise direction of the receipt as an up/down direction and satisfying the inappropriate direction condition coexist. Even in such a case, according to the modification example, when the proportion of characters satisfying the inappropriate direction condition is low enough not to satisfy the high proportion condition on the front and the proportion of the characters satisfying the inappropriate direction condition satisfies the high proportion condition on the rear, the side satisfying the high proportion condition can be automatically determined to be the rear of the receipt.

Specifically, for each of the first image and the second image, the proportion of the characters satisfying the inappropriate direction condition with respect to the total number of characters included in the image is calculated. Then, when only one proportion satisfies the high proportion condition, the image of the side satisfying the high proportion condition is determined to be the rear. It is preferable that the high proportion condition be set appropriately like "the calculated proportion is 70% or higher".

Further, in accordance with the embodiment described above, an example was described in which, when whether or not the repetitive printing body which is a character string of ten or more characters in the image is determined on the repeat item and the repetitive printing body is repeated in only one of the first image and the second image, the one image is determined to be the image of the rear. In contrast, whether or not the same character string is repeated in a unit line with no limit to the number of characters may be determined. For example, in the example of FIG. 2, a plurality of lines (two lines) configured with the character string "ABCDEFG" which is the store name are shown to be encircled by the broken lines P41 and P43 in FIG. 2. In this case with the "ABCDEFG" as a repetitive printing body, the repetitive printing body may be determined to be repeated.

Further, whether or not the same character string is repeated in one line may be determined. For example, in one line encircled by a broken line P5 in FIG. 4, a plurality (two)

of the character string (line) "KEEP THIS" are included. In this case, with "KEEP THIS" as a repetitive printing body, the repetitive printing body may be determined to be repeated.

Figure 16:
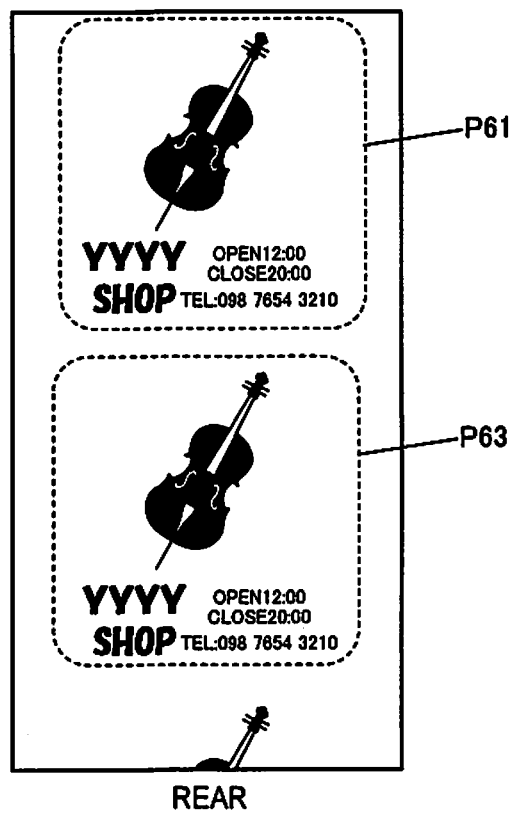
FIG. 16 is a schematic view showing another example of the rear of the receipt.

Further, the repetitive printing body is not limited to the character string, but may be an image or a mixture of a character string and an image. An example of an image printed on the rear of a receipt includes a mark of the selling store. On the other hand, an example of a mixture printed on the rear of a receipt includes a pattern in which the mark of the selling store is attached to the store information of the selling store. For example, in the receipt of which the rear is shown in FIG. 16, a plurality of mixtures of the same character string and an image enclosed by a broken line is included. In the example of FIG. 16, two are included.

In the present modification example, if a repetition of an image is determined to be a repetitive printing body, for example, for each of the first image and the second image, a pattern matching processing is performed as the image analysis processing for the area in which characters cannot be recognized by the result of OCR processing. Then, when N or more partial images match in the area in which characters could not be recognized as a result of the pattern match processing, the repetitive printing body which is the partial image is determined to be repeated. N may be two, or may be three or more, for example. Further, when a repetition of a mixture is determined to be a repetitive printing body, the OCR processing and the pattern matching processing described above are performed as an image analysis processing. Then, by the combination of the processing results, the repetition of the mixture can be determined. Further, the repetition may be determined only by a pattern match processing without the performance of the OCR processing.

Further, the processing for the front/rear determination processing is not limited to the processing described above. Other processing may be added, and a part of the processing described above may be skipped. Further, the order described above is effective, but a plurality of processing orders can be changed or a plurality of processings may also be performed simultaneously so as to determine the front/rear with the aggregated processing results.

Further, the process of analyzing the image read from a receipt with a learned model produced by machine learning and performing the front/rear determination from the pattern including the characters in the image may be added to or replace the image analysis processing and the front/rear determination processing described above. A variety of well-known methods can be adopted as a method of machine learning. However, for example, an architect of a receipt processing apparatus may teach the images of the front/rear of a large volume of receipts for which the front/rear identification is performed by a human being beforehand as teaching data, or in addition to, or in place of, this, the images of the front/rear of the receipts for which the user used the receipt processing apparatus and the final result of the front/rear identifications that have gone through the changes of the front/rear identifications by the user may be taught as teaching data. Then, when the images of the front/rear of the receipts for which the user used the receipt processing apparatus and the final result of the front/rear identifications that have gone through the changes of the front/rear identifications by the user is taught as teaching data, the receipt processing apparatus itself may perform learning so as to produce the learned model, or the receipt processing apparatus may transmit the images of the front/rear of the receipts and the final results of the front/rear identifications to an external device such as a server or the like so that the external device performs learning so as to produce a learned model and the receipt processing apparatus acquires the learned model from the external device. When used for learning in this way, the images determined to be the rear may not be deleted and may be left in a state the user cannot easily confirm.

Further, it is also possible to automatically delete the image determined to be the rear without a confirmation by the user. In particular, when the possibility of being the rear is relatively high, the image determined to be the rear is automatically deleted without a confirmation by the user, and when the possibility of being the rear is relatively low, the image determined to be the rear may be confirmed by the user and be deleted subject to the receipt of delete instruction. In addition, the outputting of the report describing the expense information is not limited to the mode of showing in the display section 130. For example, the mode of printing from the print device as an output section, the mode of storing the report data 250 in the storage section 200 as an output section, and the mode of having an external device receive the report data 250 are included.

What is claimed is:

1. A receipt processing apparatus comprising:
a calculation processor realized by electronics components, the calculation processor including
a scan control section that causes a scanner section to perform a duplex scan of a receipt so as to generate a first image which is an image of a first side including a first pattern and a second image which is an image of a second side including a second pattern,
a determination section that analyzes each of the first pattern and the second pattern and determines whether each of the first image and the second image is a front or a rear, the determination section including a first determination section that determines whether or not a repetitive printing body is repeated in at least a part of the first pattern and at least a part of the second pattern, when determining that the repetitive printing body is repeated only in one image of the first image and the second image, the first determination section determining that the one image is an image of the rear of the receipt and the other image is an image of the front of the receipt,
a discard section that discards the image of the rear, and
an output section that extracts expense information printed in the receipt on the basis of an analysis result of the image of the front and outputs a report.

2. The receipt processing apparatus according to claim 1, wherein the determination section further includes a second determination section that determines a direction of characters included in each of the first image and the second image, and, when the direction of the entire characters satisfies a predetermined inappropriate direction condition only in one of the first image and the second image, the one image is determined to be an image of the rear of the receipt and the other image is determined to be an image of the front of the receipt.

3. The receipt processing apparatus according to claim 2, wherein the inappropriate direction condition is a condition under which the inappropriate direction condition is determined to be satisfied when at least a right/left direction of the characters and a lengthwise direction of the receipt coincide.

4. The receipt processing apparatus according to claim 3, wherein, when a proportion of the characters that satisfy the inappropriate direction condition satisfies a predetermined high proportion condition in only one of the first image and the second image, the discard section discards the one image as an image of the rear of the receipt.

5. The receipt processing apparatus according to claim 1, wherein the determination section determines whether each of the first image and the second image is a front or a rear by using the characters read by an OCR processing.

6. The receipt processing apparatus according to claim 5, wherein the output section sets at least a part of a character string read by the OCR processing from an image determined to be a front as the extracted expense information.

7. The receipt processing apparatus according to claim 5, wherein the determination section further includes a third determination section that determines whether or not one of the first image and the second image is a blank image prior to the OCR processing, and when one of the first image and the second image is a blank image, the discard section discards the one image as an image of the rear of the receipt and, when one of the first image and the second image is a blank image, the OCR processing is performed only on the image of the front.

8. The receipt processing apparatus according to claim 5, wherein the determination section further includes a fourth determination section that determines a color used in each of the first image and the second image prior to the OCR processing, and when only one of the first image and the second image uses only a color that satisfies a low saturation condition, the discard section discards the other image as an image of the rear of the receipt and, when only one of the first image and the second image uses only the color that satisfies the low saturation condition, the OCR processing is performed only on an image of the front.

9. The receipt processing apparatus according to claim 1, wherein the first determination section sets a character string that constitutes the repetitive printing body as a character string of ten or more characters and determines whether or not the repetitive printing body is repeated.

10. The receipt processing apparatus according to claim 1, wherein the discard section includes an image display control section that causes the first image and the second image to be identified and displayed respectively with the image of the front and the image of the rear and an identification change section that changes the identification of the image of the front and the image of the rear on the basis of the operation input of a user, and executes the discard of an image turned out to be the rear on the basis of the identification when the discard execution input of the user is made.

11. The receipt processing apparatus according to claim 1, wherein the repetitive printing body is an image or a mixture of a character string and an image.

12. A non-transitory storage medium that stores a program for causing a computer to function as:

an acquisition section that acquires a first image which is an image of a first side including a first pattern and the second image which is an image of the second side including a second pattern, both generated by a performance of a duplex scan of a receipt by a scanner section;

a determination section that analyzes each of the first pattern and the second pattern and determines whether each of the first image and the second image is a front or a rear, by determining whether or not a repetitive printing body is repeated in at least a part of the first pattern and at least a part of the second pattern and determining that one image of the first image and the second image is an image of the rear of the receipt and the other image is an image of the front of the receipt when determining that the repetitive printing body is repeated only in the one image of the first image and the second image; and an output section that extracts expense information printed in the receipt and outputs report on the basis of an analysis result of the image of the front.

13. A method of producing a report of expense information comprising:

acquiring a first image which is an image of a first side including a first pattern and a second image which is an image of a second side including a second pattern, both generated by a performance of a duplex scan of a receipt by the scanner section;

analyzing each of the first pattern and the second pattern and determining whether each of the first image and the second image is a front or a rear, by determining whether or not a repetitive printing body is repeated in at least a part of the first pattern and at least a part of the second pattern and determining that one image of the first image and the second image is an image of the rear of the receipt and the other image is an image of the front of the receipt when determining that the repetitive printing body is repeated only in the one image of the first image and the second image; and extracting expense information printed in the receipt and producing a report on the basis of an analysis result of the image of the front.

* * * * *